United States Patent
Fox

(10) Patent No.: US 6,469,657 B1
(45) Date of Patent: Oct. 22, 2002

(54) FFT-BASED FILTERING FOR LOW-QUALITY SIGNAL DIRECTION FINDING

(75) Inventor: Neil David Fox, Fairfax, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/972,874

(22) Filed: Oct. 10, 2001

Related U.S. Application Data

(60) Provisional application No. 60/240,852, filed on Oct. 17, 2000.

(51) Int. Cl.[7] ................................................. G01S 13/42
(52) U.S. Cl. ........................ 342/147; 342/196; 342/417; 342/418; 342/21
(58) Field of Search ............................... 342/21, 98, 99, 342/147, 195, 196, 417, 418, 443

(56) References Cited

U.S. PATENT DOCUMENTS

| | | | |
|---|---|---|---|
| 4,728,959 A | * 3/1988 | Maloney et al. ............ 342/457 |
| 5,381,150 A | * 1/1995 | Hawkins et al. ............... 342/13 |
| 5,454,007 A | * 9/1995 | Dutta ........................... 375/322 |
| 5,768,477 A | 6/1998 | Johnson et al. ................ 395/22 |
| 5,964,706 A | * 10/1999 | Mo et al. ...................... 600/443 |
| 6,151,354 A | * 11/2000 | Abbey ........................... 375/211 |
| 6,353,731 B1 | * 3/2002 | Haardt et al. ............... 455/67.1 |

OTHER PUBLICATIONS

US 5,969,677, 10/1999, Herrmann et al. (withdrawn)

* cited by examiner

*Primary Examiner*—John B. Sotomayor
(74) *Attorney, Agent, or Firm*—Rothwell, Figg, Ernst & Manbeck

(57) ABSTRACT

A radio direction finding system for a low signal quality transmission signal performs a Fast Fourier Transform (FFT) on an entire received RF band into a number of FFT bins, each serving as an IF filter. The contents of each FFT bin are demodulated to decode a frequency signature from the encoded RF signal. A signal-to-noise ratio comparator receives the FFT baseband samples and determines the signal level from the known frequency signature. The FFT baseband buffer with the greatest SNR corresponding to a particular FFT frequency bin is outputted as a direction finding metric.

12 Claims, 2 Drawing Sheets

FFT-BASED FILTERING FOR LOW-QUALITY SIGNAL DIRECTION FINDING

CROSS-REFERENCE TO PROVISIONAL APPLICATION

Pursuant to 35 U.S.C. §111(b)(8) and §120, this application claims the benefit of the filing date of provisional application Ser. No. 60/240,852, filed Oct. 17, 2000.

BACKGROUND OF THE INVENTION

1. Field of the Invention

The present invention relates generally to radio direction finding systems, and more particularly to a radio direction finding apparatus and method for determining the direction of origin of an RF signal having a frequency that varies from an expected frequency, without requiring the use of multichannel receivers or fixed bandwidth scanning.

2. Description of the Background Art

Direction finding is the process of determining the location of origin of an electromagnetic signal transmission. The process therefore involves first detecting the signal and then determining a direction of arrival (DOA) angle to the signal origin point. According to one method of accurately determining the origin of the transmitted signal, at least two independent directional readings are obtained at different locations simultaneously, and phase differences between the two readings are measured to determine the DOA. Such a method is referred to as triangulation.

Another method of direction finding is to detect a transmitted signal using a rotating antenna, and determining the received signal strength at each rotational position of the antenna. The position of the antenna which gives the highest received signal strength corresponds to the direction of origin of the signal.

There are two types of direction finding. The first type, known as cooperative direction finding, involves locating the origin of an intended signal transmission, such as an electronic beacon, by pinpointing a broadcast origination location. In this case, the source may be an Emergency Location Transponder (ELT), which is used with the so-called "black box" required to be carried on aircraft. Additional cooperative sources may be RF tag tracking systems attached to personal property, to individuals, or to devices such as land mines.

Cooperative direction finding is typically implemented by encoding the transmitting signal with a signature such as, for example, an audio frequency "whoop" or periodic sweep over a predetermined audio frequency range. The direction finding receiver uses a priori knowledge of the signature to detect the signal. For example, the receiver can demodulate the received signal and perform a cross-correlation with the expected signature. The output of the cross-correlation process indicates the presence or absence of the desired signal as a function of the amplitude of the cross-correlation output signal. The amplitude also may serve as an indication of the DOA when obtained with a rotating directional antenna.

The second type, known as non-cooperative direction finding, involves locating a source of RF transmission, which may represent a hostile entity, or may represent a source of noise or interference with a radio communication system, which is desired to be eliminated. The present invention can be used with both types of radio direction finding systems; however for purposes of explanation the invention will be described with relation to a cooperative radio direction finding system.

Accurate direction finding becomes more difficult if the quality of the transmitted signal is poor, for instance, if the frequency of the transmitted signal is unstable, varies or drifts over time, or has a constant but unknown frequency bias error.

In the case of a low-quality transmission signal, the direction finding receiver according to the conventional art employed one or more compensatory measures. One such measure is to increase the detection bandwidth of the receiver to increase the probability of detecting the transmitted signal. However, as is well known, increasing the bandwidth of the receiver also increases the probability of receiving noise. Consequently, the overall signal-to-noise ratio (SNR) of such receivers is degraded, which results in a reduced effective range of direction finding.

Another approach has been to maintain the bandwidth of the receiver, but to employ a multichannel receiver to detect the RF transmission source. A multichannel receiver in essence is a number of identical receivers operating in parallel, whose bandwidths each represent a different frequency channel or portion of the RF spectrum of interest. The aggregate of the channels corresponds to the entire RF spectrum of interest. While effective, multichannel receivers are complex and expensive.

A third approach involves scanning the RF bandwidth of interest with a receiver of a fixed IF bandwidth. While this approach theoretically may come close to the performance of a multichannel receiver, in the real world the performance of such a scanning receiver is limited by scan rate limitations.

Of course, such compensatory receiver measures become unnecessary if the transmitter frequency is made very stable. Under such circumstances a very simple receiver may be used to achieve near-optimal SNR performance. However, it is not always possible to ensure a stable transmitter frequency. For example, where the transmitter is a tagging device, its proximity to other objects cannot be controlled. The nature of such objects will cause the frequency of the transmitter oscillator to be "pulled" to various extents, and consequently the frequency of the transmitter will change over time. Moreover, because of size and power constraints, it may not be possible to provide such transmitters with the necessary frequency stabilization electronics. Long-term aging of a transmitter in the field will cause the transmitting frequency to shift over time. This frequency shift could place the transmitted signal outside of the bandwidth of the receiver, and thereby disable the direction finding system.

Stable transmitter frequency also cannot be guaranteed where the transmitter source is non-cooperative, i.e., where the source may be a hostile transmitting source or a passive noise source, it is not under the control of the party carrying out direction finding.

The prior art has used Fourier transforms in order to aid in signal identification and direction finding. The Fourier transform may be used to convert an electromagnetic signal from the time domain to the frequency domain. This may be done to aid in detection and characterization of a subject signal. For example, U.S. Pat. No. 5,768,477, incorporated herein by reference, uses an FFT (Fast Fourier Transform) array processor to receive a time series of samples from N channels of a multichannel receiver which receives multiple signals, and to provide a series of complex values for each channel. A computer estimates a covariance matrix from the complex values outputted by the FFT array processor, and the covariance matrix is inputted to a neural network to determine the number of received signals and the angles of arrival of each of the multiple signals.

As noted, the '477 patent requires multiple receivers and is therefore complex and expensive. There thus remains a need in the art for improvement in radio direction finding systems.

SUMMARY OF THE INVENTION

A radio direction finding system for determining a direction of origin of a transmitted RF signal is provided, wherein an RF receiver receives the entire RF band of interest. The detected RF signal is subjected to an FFT process, wherein each frequency bin of the FFT process serves as an IF filter for the received RF signal and acts as a separate channel. Each FFT bin is independently processed to demodulate an encoded signature from the RF signal and to provide an FFT baseband. The FFT baseband samples are compared to determine the channel having the greatest SNR with respect to the demodulated signature frequency as a signal level.

In particular, the invention provides a radio direction finding system for determining a direction of origin of a source of a transmitted radio frequency (RF) signal, including an antenna capable of receiving the RF signal, an RF receiver coupled to the antenna system, the RF receiver having a bandwidth for receiving an entire RF band of interest in which the transmitted RF signal may lie, and outputting a detected signal, an analog-to-digital (A/D) converter coupled to the RF receiver and digitizing the detected signal to provide a series of RF samples, a Fast Fourier Transform (FFT) processor coupled to the A/D converter and performing a Fourier transform on the series of RF samples, the FFT processor producing a plurality of component frequency approximations representing frequency components of the detected signal into a plurality of FFT bins, each having a predetermined frequency size, a plurality of demodulators, each receiving the contents of a corresponding FFT bin, and subjecting the contents to a demodulation process whereby an FFT baseband sample is produced for each of the plurality of FFT bins, and a signal-to-noise ratio (SNR) processor that determines a maximum SNR from among the plurality of FFT baseband samples, and outputs an FFT baseband signal whose SNR is determined to be greatest, wherein the outputted FFT baseband signal having a greatest SNR is used as a direction finding metric for determining a direction of arrival (DOA) angle of the RF signal.

A method of radio direction finding is also disclosed.

The above and other features and advantages of the present invention will be further understood from the following description of the preferred embodiments thereof, taken in conjunction with the accompanying drawings.

DETAILED DESCRIPTION OF THE PREFERRED EMBODIMENTS

Figure 1:
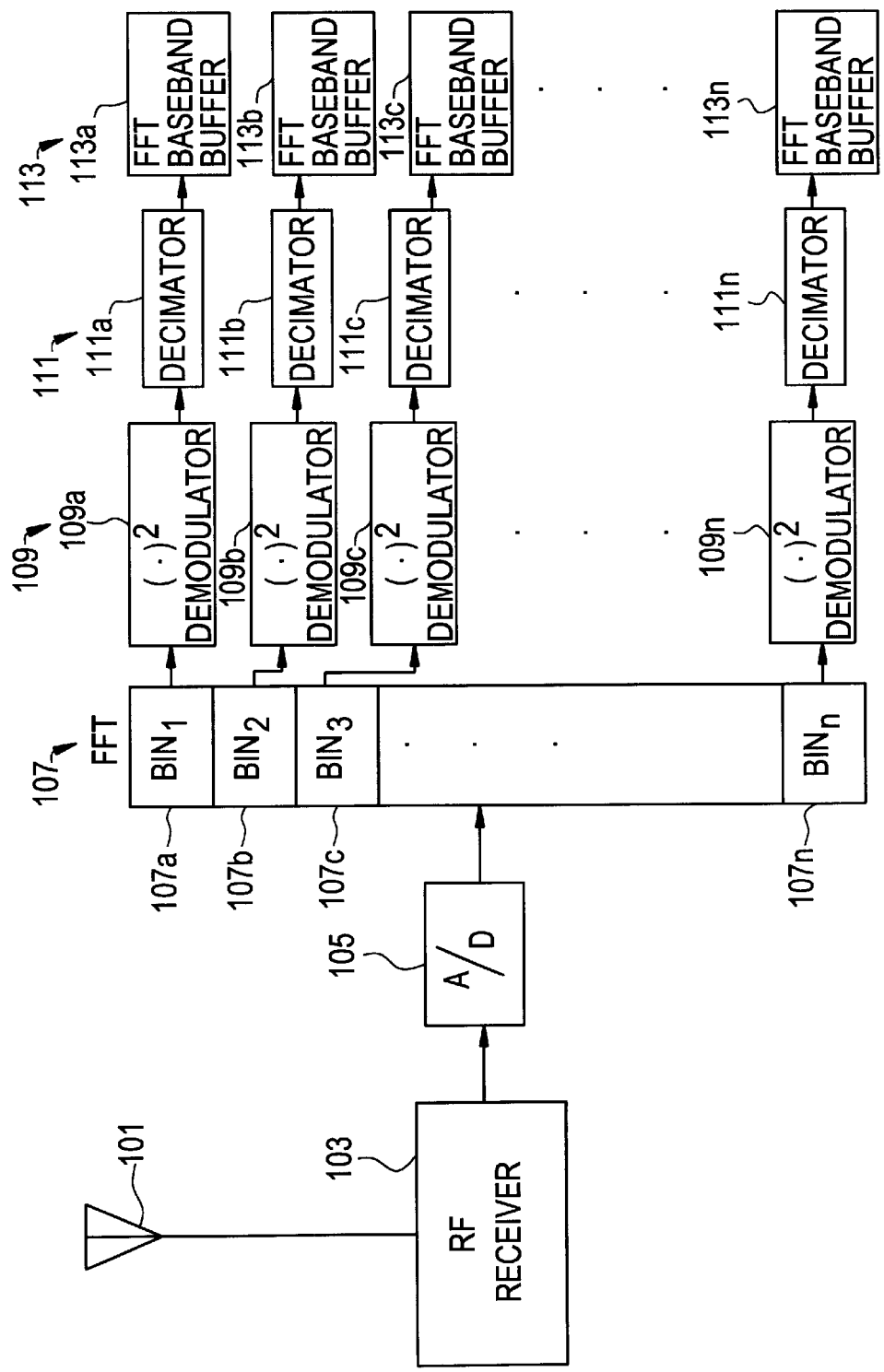
FIG. 1 is a block diagram of an FFT-based system for direction finding of a low-quality RF signal according to a preferred embodiment of the present invention, by developing a plurality of FFT baseband samples in response to the output of a wideband RF receiver.

FIG. 1 is a block diagram of a direction finding apparatus according to a preferred embodiment of the invention. The apparatus includes an antenna system 101, a radio frequency (RF) receiver 103, an analog-to-digital (A/D) converter 105, a Fast Fourier Transform (FFT) processor 107, a plurality of demodulators 109, a plurality of decimators 111, and a plurality of FFT baseband buffers 113.

The antenna system 101 receives an RF electromagnetic wave. The antenna system 101 may be any type of antenna system that has a directional reception ability. For example, the antenna system 101 may be a rotatable dish or parabolic antenna, an antenna array, or any other type of antenna or antenna grouping that produces a directional reception response. The directional reception ability refers to the ability of the antenna system 202 to provide a varying signal reception based on its orientation.

The RF receiver 103 is coupled to the antenna system 101 and receives RF signals from the antenna system 403. According to the invention, the bandwidth of the RF receiver 103 is set to be wide enough to receive the entire RF band of interest.

The signal received by the RF receiver 103 is digitized in A/D converter 105, and provided to FFT processor 107 as a series of RF samples. The FFT processor processes the samples from A/D converter into a number of FFT samples, which are accumulated in a number of bins 107a–107n. Each bin serves as an intermediate frequency (IF) filter, such that each FFT bin 1-n serves as a channel, and is thus processed independently of the other FFT bins.

A Fourier transform results in a waveform having a shape corresponding to the presence of sinusoidal frequency components. Complex waveforms may be transformed by the Fourier transformation into sums of simple, sinusoidal functions at different frequencies. Therefore, to determine the response of a certain system to a complex input signal, the input signal may be broken down into a sum of sinusoidal elements and the system response to each sinusoidal element may be analyzed. This technique is referred to as analysis in the frequency domain. In general, the Fourier transform is used to move a function from amplitude as a function of time to amplitude as a function of frequency. Looking at a function which describes amplitude in terms of frequency reveals the signal strength in a particular range of frequencies.

For each channel 1-n, the contents of the FFT bin are subjected to a squaring process in squaring demodulators 109a–109n, to thereby decode an encoded audio frequency tone and output an audio frequency sample. The audio frequency tone, for example, would be part of the signature of the transmitted signal, which would be known a priori by the receiver in a cooperative direction finding system.

Because the number of samples needed depends upon the audio tone frequency and not the higher IF frequency, less samples are required from the squaring process demodulators to meet the Nyquist criteria than are provided by the squaring process demodulators 109a–109n. Consequently, a plurality of decimators 111a–111n are provided for each channel to decimate or reduce the number of samples from the demodulators 109a–109n to the number required by the Nyquist criteria. The resulting samples are FFT baseband buffered in FFT baseband buffers 113a–113n.

Figure 2:
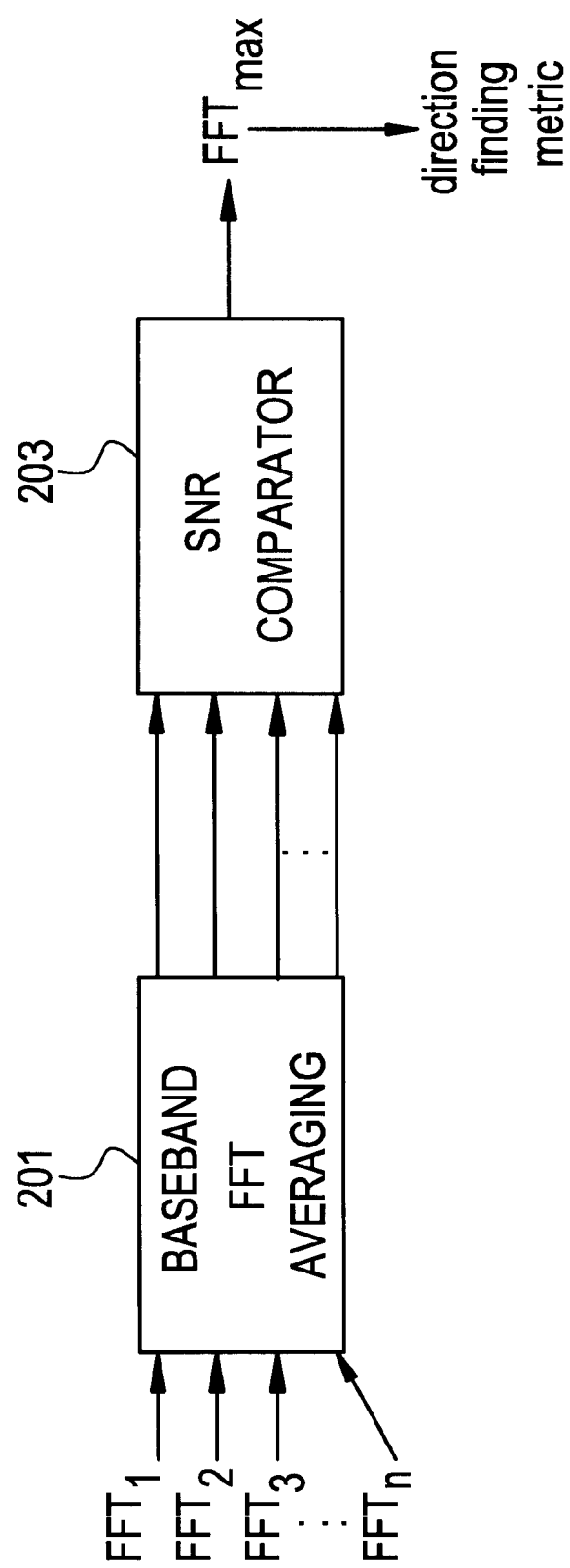
FIG. 2 is a block diagram of apparatus according to a preferred embodiment of the invention that processes the FFT baseband samples from the FFT-based system of FIG. 1 to output a single FFT sample as a direction finding metric.

As shown in FIG. 2, the FFT baseband samples from FFT baseband buffers 113a–113n are averaged in a baseband FFT averager 201 to smooth out the noise floor, and to generally increase the quality of the decoded audio tone signal. The averaged FFT baseband samples are then inputted to an SNR comparator 203, where each baseband sample from the n channels are compared in a "greatest-of" comparison decision process, and the FFT baseband signal having the highest SNR is output as a direction finding metric, which is processed as is known in the art. The signal level is determined by using the a priori knowledge of the signature encoded onto the RF signal by the transmitter. For example, if a 400 Hz tone is encoded on the RF signal, then the output of FFT bin (when averaged) corresponding to 400 Hz is used to determine the signal level estimate.

The FFT output obtained from the FFT processing on the RF samples also may be averaged over short time intervals to improve the quality of the measurement. Each FFT bin in effect serves as an IF filter of the detected RF signal. The FFT bin size may be changed to adjust the time required for the receiver to obtain a direction finding measurement. Changing the FFT bin size is the same as changing the FFT dwell time or sample period, since they are reciprocal parameters of detection range/accuracy. For example, a 0.1 Hz FFT bin size implies a 10 second FFT dwell time.

The net effect of the invention is that the SNR remains high, even though the entire RF band is received, because the individual FFT bins correspond to relatively small IF values. The A/D sample rate of the A/D converter is set to correspond to the FFT bin size selected.

The FFT filter-based direction finding system may be implemented using firmware or software. FFT algorithms are well suited for implementation in a standard commercially available computer, such as a PC or a workstation. Alternatively, the FFT algorithms may be implemented using a customized printed circuit board using floating point gate arrays.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A radio direction finding system for determining a direction of origin of a source of a transmitted radio frequency (RF) signal, comprising:

an antenna capable of receiving said RF signal;

an RF receiver coupled to said antenna system, said RF receiver having a bandwidth for receiving an entire RF band of interest in which said transmitted RF signal may lie, and outputting a detected signal;

an analog-to-digital (A/D) converter coupled to said RF receiver and digitizing said detected signal to provide a series of RF samples;

a Fast Fourier Transform (FFT) processor coupled to said A/D converter and performing a Fourier transform on said series of RF samples, said FFT processor producing a plurality of component frequency approximations representing frequency components of said detected signal into a plurality of FFT bins, each having a predetermined frequency size;

a plurality of demodulators, each receiving the contents of a corresponding FFT bin, and subjecting said contents to a demodulation process whereby an FFT baseband sample is produced for each of said plurality of FFT bins; and a signal-to-noise ratio (SNR) processor that determines a maximum SNR from among said plurality of FFT baseband samples, and outputs an FFT baseband signal whose SNR is determined to be greatest;

wherein said outputted FFT baseband signal having a greatest SNR is used as a direction finding metric for determining a direction of arrival (DOA) angle of said RF signal.

2. The radio direction finding system of claim 1, wherein said transmitted RF signal includes a predetermined frequency signature.

3. The radio direction finding system of claim 2, wherein said plurality of demodulators comprise squaring process demodulators for demodulating an encoded audio frequency from each of said FFT bins.

4. The radio direction finding system of claim 3, wherein said SNR processor determines a signal level according an averaged value from an FFT bin corresponding to said predetermined frequency signature.

5. The radio direction finding system of claim 2, wherein said predetermined frequency signature is an audio frequency.

6. The radio direction finding system of claim 1, further including a plurality of decimators for reducing the number of FFT baseband samples provided to said SNR processor from said plurality of demodulators to a number required by a Nyquist sampling criterion.

7. A method of determining a direction of origin of a source of a transmitted radio frequency (RF) signal, comprising the steps of:

receiving an entire RF band of interest in which said transmitted RF signal may lie, and outputting a detected signal;

digitizing said detected signal to provide a series of RF samples;

performing a Fast Fourier Transform (FFT) on said series of RF samples, said FFT producing a plurality of component frequency approximations representing frequency components of said detected signal into a plurality of FFT bins, each having a predetermined frequency size;

subjecting the contents of a corresponding FFT bin to a demodulation process whereby an FFT baseband sample is produced for each of said plurality of FFT bins; and determining a maximum SNR from among said plurality of FFT baseband samples, and outputting an FFT baseband signal whose SNR is determined to be greatest;

wherein said outputted FFT baseband signal having a greatest SNR is used as a direction finding metric for determining a direction of arrival (DOA) angle of said RF signal.

8. The method of claim 7, wherein said transmitted RF signal includes a predetermined frequency signature.

9. The method of claim 8, wherein said demodulation process comprises a squaring process for demodulating an encoded audio frequency from each of said FFT bins.

10. The method of claim 9, wherein said SNR processor determines a signal level according an averaged value from an FFT bin corresponding to said predetermined frequency signature.

11. The method of claim 8, wherein said predetermined frequency signature is an audio frequency.

12. The method of claim 7, further including the step of reducing the number of FFT baseband samples used in said SNR process from said demodulation process to a number required by a Nyquist sampling criterion.

* * * * *